United States Patent [19]

Kleinhans et al.

[11] Patent Number: 5,402,917

[45] Date of Patent: Apr. 4, 1995

[54] ROTARY DRUM FOR DISPENSING FLOWABLE MATERIAL AND HEATING HOOD THEREOF

[75] Inventors: Mathias Kleinhans, Remseck; Ferdinand Werni, Weinstadt-Schnait; Reinhard Froeschke, Weinstadt, all of Germany

[73] Assignee: Santrade Ltd., Luzern, Switzerland

[21] Appl. No.: 163,750

[22] Filed: Dec. 7, 1993

[30] Foreign Application Priority Data

Dec. 24, 1992 [DE] Germany .................. 42 44 038.6

[51] Int. Cl.⁶ .............................................. B67D 5/62
[52] U.S. Cl. .......................... 222/146.2; 118/256; 222/181; 222/403; 222/415; 222/420
[58] Field of Search .............. 222/109, 146.2, 181, 222/403, 410, 414, 415, 420; 118/244, 256, 325, 681

[56] References Cited

U.S. PATENT DOCUMENTS

| | | | |
|---|---|---|---|
| 4,178,876 | 12/1979 | Nicklas et al. | 118/681 |
| 4,232,064 | 11/1980 | Nicklas et al. | 118/681 X |
| 4,623,307 | 11/1986 | Froeschke | 425/8 |
| 4,671,205 | 6/1987 | Billeter | 118/325 X |
| 5,232,128 | 8/1993 | Froeschke | 222/109 |
| 5,232,504 | 8/1993 | Didier et al. | 118/681 |

FOREIGN PATENT DOCUMENTS

| | | | |
|---|---|---|---|
| 2476704 | 8/1981 | France | 118/244 |
| 4013405 | 7/1991 | Germany . | |
| 4119021 | 8/1992 | Germany . | |

OTHER PUBLICATIONS

Brochure: Sandvik Rotoform-Verfahren, Prospectus Sandvik Rotoform Process, PS-409 GER5.89.

Primary Examiner—Andres Kashnikow
Assistant Examiner—Joseph A. Kaufman
Attorney, Agent, or Firm—Burns, Doane, Swecker & Mathis

[57] ABSTRACT

A rotoformer includes a rotary drum for dispensing drops or strips of a free-flowing compound onto a cooling belt. A heating hood overlies the drum and is swingable to an inoperative position to afford access to the drum. The hood is mounted for swinging movement on a vertical axis which is offset from a horizontal axis of rotation of the drum so that when in its inoperative position, no part of the hood overlies the cooling belt. A part of the hood is relocatable, e.g., by being swingable upwardly, or by being detached, to permit the hood to be swung to its inoperative position.

17 Claims, 4 Drawing Sheets

ROTARY DRUM FOR DISPENSING FLOWABLE MATERIAL AND HEATING HOOD THEREOF

BACKGROUND OF THE INVENTION

The invention relates to a device for issuing free-flowing compounds such as strips or drops on a cooling belt, which travels underneath the device, said device comprising at least one rotatable drum, whose circumference is provided with openings, through which the compound to be issued penetrates cyclically when the drum rotates, and comprising a heating hood that overlies and covers the drum in the region facing away from the cooling belt.

Devices of this kind are known, e.g., see German Document 40 13 405-C1. The heating hood serves to control the temperature of the periphery of the rotating drum, to which residual material, which has not totally dripped off, can adhere. Said residual material must be prevented from solidifying so that it can be pushed by a guide back into the openings of the rotating drum. To perform maintenance work, the known heating hoods of other designs available on the market (Sandvik Rotoformer, Prospectus Sandvik Rotoform Process, imprint PS-409 GER 5.89) are designed so as to swing up around an axis arranged parallel to the axis of the rotating drum, wherein this axis is arranged on the side of the granulator lying in the direction of movement of the cooling belt. By swinging the hood up, the periphery of the rotating drum is perhaps accessible, but the mounting, located in front of the granulator, for the swivel axis of the heating hood prevents free accessibility for maintenance work, as for, example to remove the rotating drum from the stationary inner cylinder, as in the case of the rotoformer. This situation necessitates a relatively time-consuming disassembly of the entire heating hood including its mounting.

SUMMARY OF THE INVENTION

The present invention is based on the desire to avoid these drawbacks and find a simple way for removing the heating hood without additional complexity.

To solve this problem it is provided for a device of the aforementioned kind that the heating hood can be swung away radially from the drum around an axis extending orthogonally to the axis of rotation of the drum and is provided with a part that can be detached or raised at least in the region in which the drum is in the swivel path.

With this design a simple swinging process suffices for the part that can be raised and a subsequent swivel process, in order to move the heating hood totally out of the region of the rotating drum and to swing into a region, which lies on the side next to this drum and is still next to the cooling belt.

Another advantageous embodiment of the invention provides that the swivel axis of the swivel arm lies on the side of a vertical plane extending through the axis of the drum, said side lying opposite the running direction of the carrying run of the cooling belt facing the drum. Therefore, compared to the designs known to date, the swivel axis and the entire device for the heating hood lie in the direction of movement of the cooling belt still upstream of the granulator. It is expedient for a granulator having a drum whose axis is in the region of the vertical plane, in which the axis of the deflecting roller for the cooling belt is disposed, to arrange the swivel axis of the swivel arm also on the side of the vertical plane extending through the axis of the deflecting drum, said side being opposite the running direction of the carrying run of the cooling belt. Then the heating hood can be swung away in a region that also lies in front of the deflecting drum for the cooling belt. Thus, there no longer exists an impediment.

For a granulator with a guide that keeps the drum shell free of compound that has not dripped off and which in turn is attached to a swivel mounting, as known, e.g., from German Document 41 19 021-C1, it is especially expedient to also provide the swivel arm of the heating hood as a swivel arm for the guide. It is then expedient to mount the swivel arm with a rotary sleeve to a hollow pin arranged in the swivel axis, where the rotary sleeve can also serve to convey the heating medium to the heating hood or to the hood and to the guide.

Finally, it is advantageous, if the raisable part of the heating hood is attached to a hinge, which is connected to the swivel arm and which is also designed as a swivel axis for the other part of the heating hood. Then it is also possible, as in the case of the prior art constructions, to swing the horizontal and vertical parts of the heating hood about a single axis located at the top the upper section of the heating hood, in order to obtain a clear view of and access to the rotating drum and in order to be able to make any minor corrections.

BRIEF DESCRIPTION OF THE DRAWING

The invention is shown in the drawings with the aid of two embodiments and is explained in the following.

DETAILED DESCRIPTION OF THE PREFERRED EMBODIMENTS OF THE INVENTION

Figure 1:
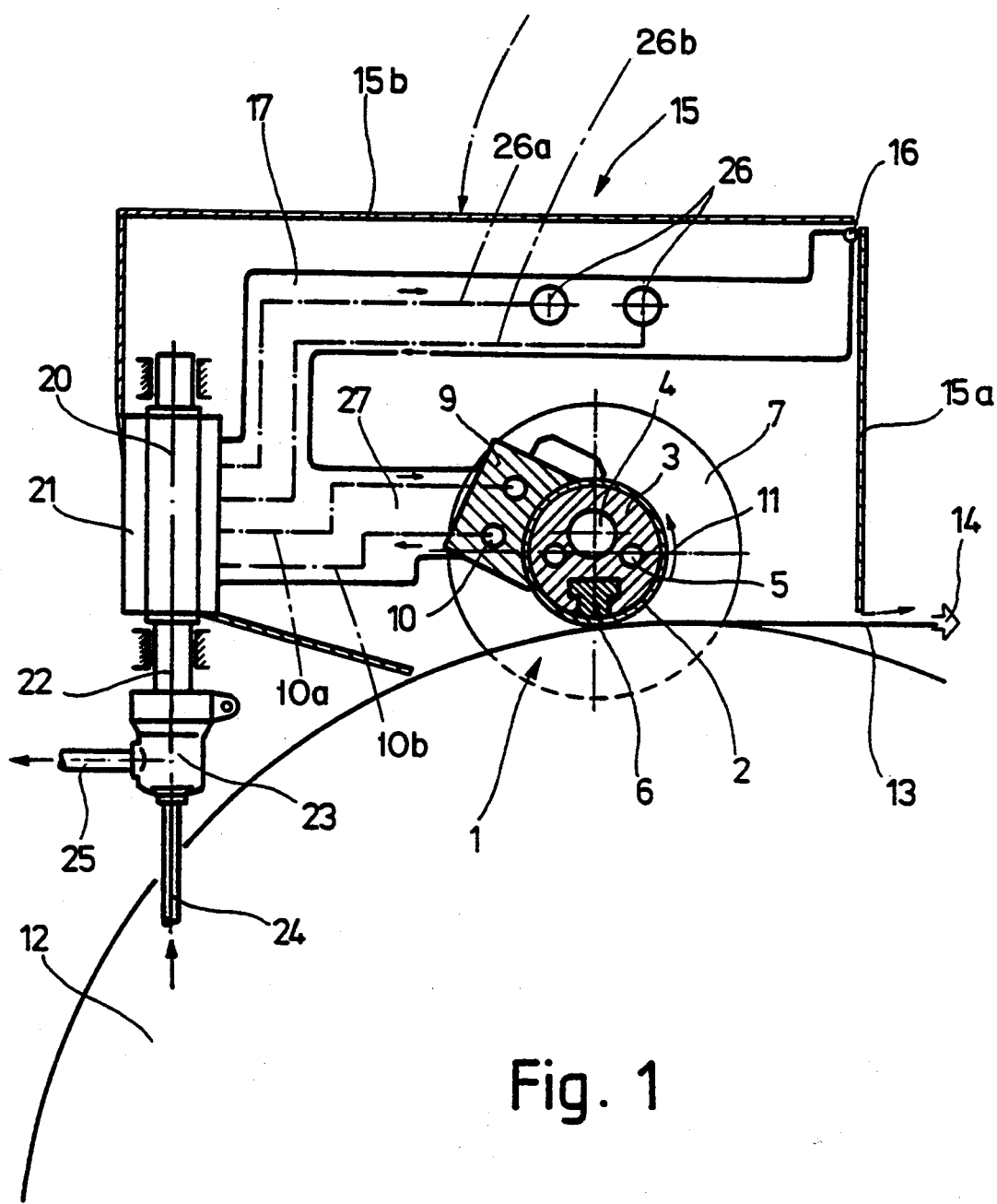
FIG. 1 is a schematic sectional view of a so-called rotoformer with a guide and a heating hood according to a first embodiment of the invention.
Figure 5:
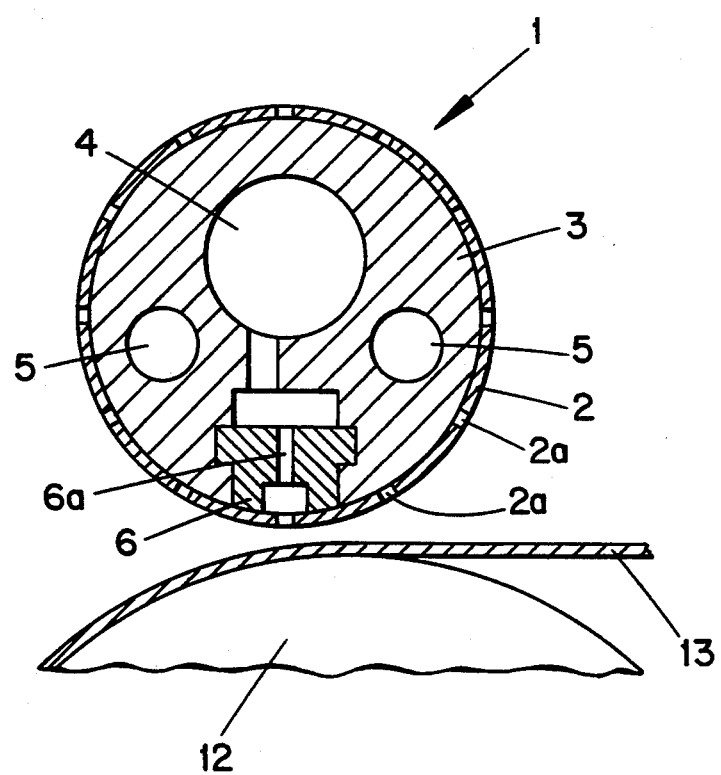
FIG. 5 is a vertical sectional view of a conventional rotoformer.

Depicted schematically in FIG. 1 and in greater detail in FIG. 5 is a so-called rotoformer (1), as manufactured and marketed by the Sandvik Process Systems company, Fellbach and described for example in U.S. Pat. No. 4,623,307. This rotoformer (1) comprises in essence a rotating pipe or drum (2), whose circumference is provided with openings 2a and which is mounted rotatably on an inner, cylindrical drum body (3). This inner drum body (3) exhibits a feed channel (4), extending in its axial direction, for the material which is to be processed and which is fed via conduct 4a as a low viscosity material into this feed channel (4) from one end of the stationary drum. The inner drum (3) also exhibits heaters (5) and an axially inserted nozzle lip (6), which constitutes a slot having downwardly directed openings 6a and which is connected to the feed channel (4) in a manner that is not shown in detail. This inner drum (3) is disposed on the side of a bearing (7), which in turn is attached stationarily to a holding arm (8).

In the embodiment a guide (9), which is also axially penetrated with heater channels (10), lies on the outer periphery of the rotating outer drum (2). This guide (9) serves to push back into the drum openings any adhering material on the outer periphery of the drum (2), which drum is provided with a drive (not illustrated) and rotates in the direction of the arrow (11). The low viscosity material entering through the feed channel (4) is pushed out downwardly drop-by-drop in the well-known manner through the openings of the nozzle (6) and through the openings of the outer drum (2), when the openings of the outer drum (2) are brought cyclically into alignment with the openings in the nozzle lip (6) when the outer drum is rotated.

Provided beneath the rotoformer (1) is a deflecting roller (12) for a cooling belt (13), which is moved in the direction of the arrow (14) and is generally a steel belt. The drops emerging on the underside of the rotoformer (1) fall on the cooling belt (13) and solidify there as the cooling belt continues to move.

The rotoformer (1) is covered by a heating hood (15), which comprises an end, part (15a) that can be swung up and that comprises a wall oriented somewhat perpendicularly on the cooling belt (13); and a main part or cover (15b) which can also be swung up. The cover (15b) and the end part (15a) are both attached to a hinge which forms an axis (16) extending parallel to the axis of rotation of the drum (2). The hood overlies portions of the cooling belt (13) disposed ahead of and behind the rotoformer (1). That is, the hood overlies a belt-approach side 1A and a belt-departure side 1B of the drum.

This hinge axis (16) and the heating hood (15) are held by supporting arms (17, 18), having ends lying in front of the rotoformer (1) which are attached to a swivel arm (19). That arm (19) can be moved around a swivel axis (20) which extends transversely relative to the drum axis and is offset therefrom. More preferably, the swivel axis (20) is offset from (i.e., non-intersecting), and oriented perpendicular to, the drum axis (i.e., the swivel axis (20) is orthogonal to the drum axis). Most preferably, the swivel axis (20) is offset from a horizontal drum axis and oriented vertically. In this embodiment this swivel axis (20) is offset from an edge of the cooling belt (13) and is situated on the belt-approach side 1A of the rotoformer (1), i.e., the side that lies in the direction of motion of the cooling belt (13) toward the rotoformer.

The swivel arm (19) is attached with the aid of a rotary sleeve (21) (which is shown only diagrammatically) to a stationary, perpendicular pin (22), whose axis corresponds to the swivel axis (20). The pin (22) is hollow and receives by way of a coupling (23) and a feed pipe (24), a liquid heating medium, which eventually is led off through a discharge pipe (25). The pin can be divided into a feed portion (22a) and a return portion (22b). The supplied heating medium serves, first of all, to heat the heating channels (10) of the guide (9), and secondly to convey heating medium in the heating hood (15) in the region of the rotoformer (1). Connecting lines (10a, 10b, 26a, 26b) extend to and from these coils (26) and are connected to the rotary sleeve (21). Those lines are disposed inside the supporting arms (17 and/or 18). The lines (26a) are connected through the swivel arm (19) to the feed portion (22a) of the pin, and the lines (26b) are connected to the return portion (22b) of the pin, when the hood is in its operative position. As apparent from FIGS. 1 and 2, in addition to these supporting arms (17, 18) for carrying the hinge axis (16), there is also a supporting arm (27) which is connected rigidly to both the swivel arm (19) and the guide (9) in such a manner that the guide can be pressed elastically against the circumference of the rotating drum (2). Lines (10a, 10b) are disposed within the supporting arm (27) for conducting heating medium to and from the heating channels (10). Those lines are connected through the swivel arm (19) to the feed and return portions (22a, 22b) of the pin (22) when the hood is in its operative position.

Figure 2:
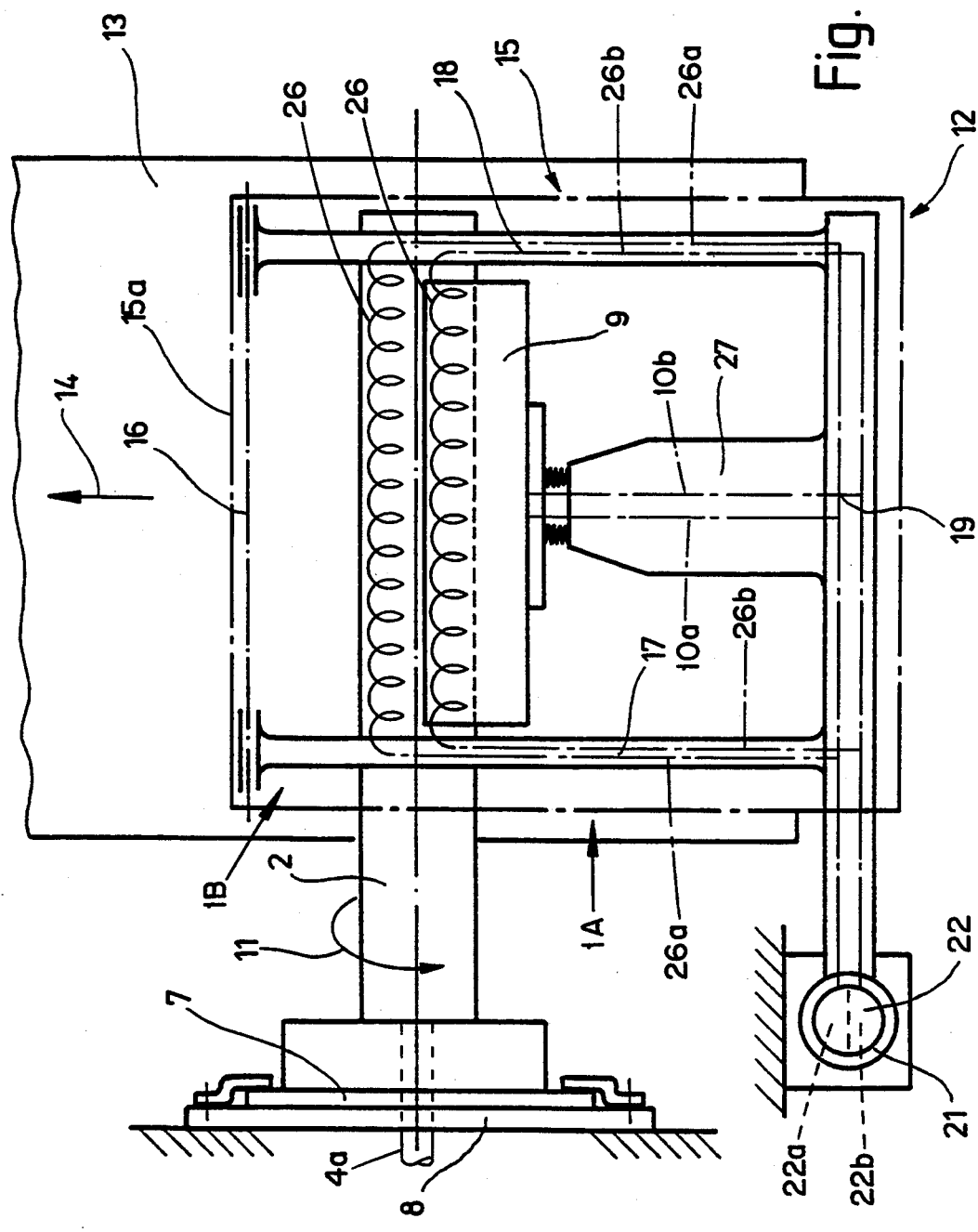
FIG. 2 is a top view of the device of FIG. 1 with the cover of the heating hood shown in phantom for clarity.

It is apparent from the figures that for performing maintenance work at the rotoformer (1) it suffices to relocate the end part (15a) by swinging it upwards counterclockwise around the hinge (16) (with reference to FIG. 1) and then to unlock the swivel arm (19), which is fixed, of course, in its position according to FIGS. 1 and 2, and then to swing it clockwise with reference to the showing in FIG. 2. For example, the arm (19) can be swung by 180°. In so doing, both the guide (9) and the heating hood (15) are moved away from the outer drum (2) about the axis (20) to an inoperative position that lies behind the deflecting drum (12) and next to the cooling belt (13). Now, no part of the hood overlies the belt (13). Then, it is possible without further ado to detach, for example, the rotating outer drum (2) from its mounting on the inner drum (3) and to remove it axially, in order to replace it with another outer drum. All other maintenance work can also be performed without hindrance.

Figure 3:
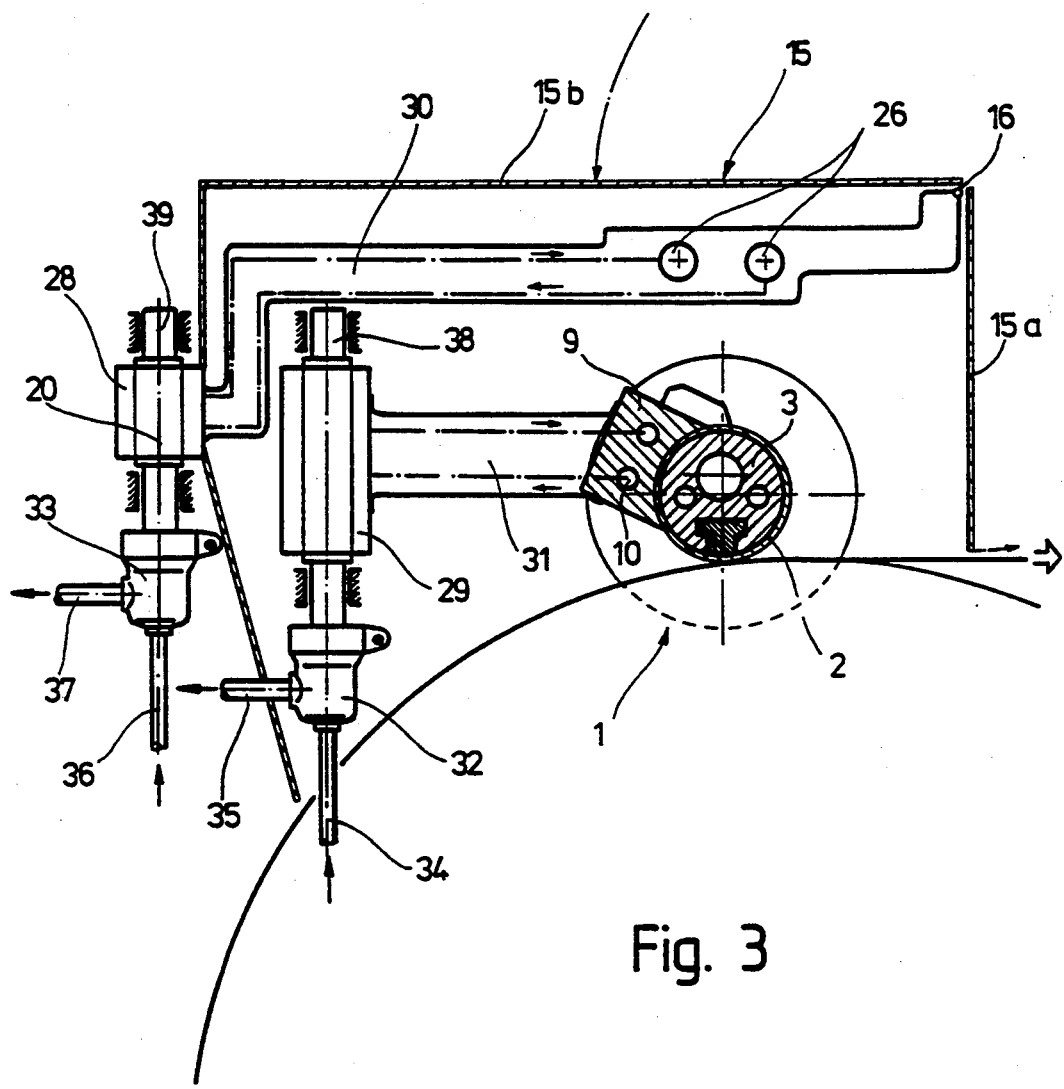
FIG. 3 is a view similar to FIG. 1, but of another embodiment according to the invention.

FIG. 3 shows a modification, wherein the heating hood (15) and the guide (9) are not attached to a common swivel arm (19), but rather to separate swivel arms (not shown, but each swivel arm corresponding to swivel arm (19) of FIG. 2) connected to rotary sleeves (28 and 29). The heating hood (15), which is also provided in this case with the end part (15a) and the cover (15b), both of which can be swivelled around the hinge axis (16), is connected by way of supporting arms (30) to the swivel arm in which the feed and discharge pipes for the heating medium to the heating coils (26) are laid. The guide (9) is connected by way of supporting arms (31) to its related swivel arm (or directly to its rotary sleeve (29)). The supporting arms (31) are also provided with feed and discharge lines to the heating channels (10) in the guide (9) for conducting a heating medium. The rotoformer (10) corresponds otherwise to the embodiment according to FIG. 1.

In the embodiment according to FIG. 3, the heating medium is fed to the hollow pin (38) by way of a feed bushing (32), which is connected to a feed pipe (34) and a discharge pipe (35). The feed pipes run in a well-known manner through a hollow pin (38) which also forms the swivel axis for the swivel arm of the guide (9), to the rotary sleeve (29) and from there to the guide (9). Heating medium is fed to the heating coils (26) by way of the feed pipe (36), which opens into a coupling (33). From there the heating medium flows by way of a hollow pin (39) into the rotary sleeve (28) and from there by way of the pipes into the supporting arms (30) of the heating coils (26). The heating medium returns in the reverse manner by way of the coupling (33) and from there through a discharge pipe (37) back to a collector, from where the heating medium, just like the heating medium recirculated to the guide (9), is conveyed in a cycle and reheated prior to the feed operation.

Figure 4:
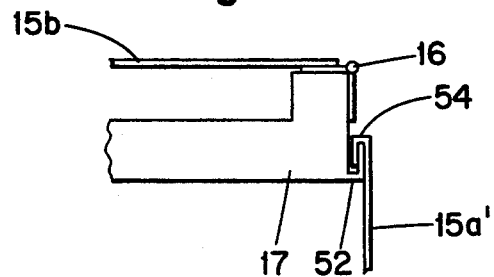
FIG. 4 is a fragmentary view of an end part of a heating hood, depicting a releasable mounting therefor.

Depicted in FIG. 4 is an alternative mounting for the end part (15a') of the hood which comprises a hook (52)

carried by each supporting arm (17, 18) for receiving a hook (54) carried by the end part (15a'). When it is desired to move the hood to the inoperative position, the end part (15a') is relocated by being lifted off the hook (52), and the main part (15b) of the hood is swiveled about the axis (20).

The main part (15b) of the hood (15) could be provided with downwardly extending side walls. Any of those side walls which would obstruct rotation of the hood about the swivel axis 20 (e.g., side walls disposed on the left side of the hood with reference to FIG. 2), could be provided with a relocation feature such as the hinge (16) or the hooks (52, 54) described above.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Apparatus for discharging a free flowing compound onto a surface, said apparatus comprising:
    a drum rotatable about a first axis and having openings formed therein through which the compound flows when said openings reach a lower portion of said drum; and
    a heating hood including heating means for heating an outer periphery of said drum, said hood including:
        a first part overlying said drum in an operative position of said main part, and
        a second part extending downwardly from said first part to an elevation below an upper portion of said drum,
        said first part being rotatable between said operative position and an inoperative position about a second axis oriented transversely relative to said first axis,
        said second part being relocatable relative to said first part to permit said hood to be swung to said inoperative position.

2. Apparatus according to claim 1, wherein said second axis is offset from said first axis.

3. Apparatus according to claim 1, wherein said second axis is oriented orthogonally relative to said first axis.

4. Apparatus according to claim 1, wherein said first axis is oriented horizontally, and said second axis is oriented substantially vertically and is offset from said first axis.

5. Apparatus according to claim 4, further including a belt disposed beneath said drum and defining said surface onto which the compound is discharged, wherein said second axis is offset from said first axis in a direction towards a belt-approach side of said drum, said second axis being offset outwardly from an edge of said belt so as to be in non-intersecting relationship with said belt.

6. Apparatus according to claim 1, further including a belt disposed beneath said drum and defining said surface onto which the compound is discharged, wherein said second axis is offset from said first axis in a direction towards a belt-approach side of said drum, said second axis being offset outwardly from an edge of said belt so as to be in non-intersecting relationship with said belt wherein no part of said hood overlies said belt when said hood is in said inoperative position.

7. Apparatus according to claim 1, wherein said second part of said hood is relocatable by being mounted for upward movement relative to said main part.

8. Apparatus according to claim 7, wherein said second part is swingable about an axis extending substantially parallel to said drum axis.

9. Apparatus according to claim 1, wherein said second part of said hood is relocatable by being removable.

10. Apparatus according to claim 1 further including a guide for engaging an outer periphery of said drum for removing residual compound from said outer periphery, said guide being swingable with said hood to an inoperative position about said second axis.

11. Apparatus according to claim 1 further including a guide for engaging an outer periphery of said drum for removing residual compound from said outer periphery, said guide being swingable independently of said hood to an inoperative position about a third axis extending substantially parallel to said second axis.

12. Apparatus according to claim 1 including a hollow pin defining said first axis, arm means interconnecting said hood and said hollow pin, heating means movable with said hood, and a conduit arrangement disposed in said arm means and communicating with said hollow pin for conducting heating medium to and from said heating means.

13. Apparatus according to claim 12 further including a guide for engaging an outer periphery of said drum for removing residual compound from said outer periphery, said guide having a heating channel formed therein and being swingable with said hood about said second axis, support arm means interconnecting said hollow pin and said guide means, and a conduit arrangement formed in said support arm means and communicating with said hollow pin for conducting heating medium to and from said heating channel.

14. Apparatus according to claim 12 further including a guide for engaging an outer periphery of said drum for removing residual compound from said outer periphery, said guide having a heating channel formed therein and being swingable independently of said hood arm about a third axis to an inoperative position, said third axis extending substantially parallel to said second axis and including an additional hollow pin, additional support arm means interconnecting said additional hollow pin and said guide means, and a conduit arrangement formed in said additional support arm means and communicating with said hollow pin for conducting heating medium to and from said heating channel.

15. Apparatus for discharging a free flowing compound onto a cooling belt, said apparatus comprising:
    a drum rotatable about a horizontal first axis and having openings formed therein through which the compound flows when said openings reach a lower portion of said drum; and
    a heating hood including heating means for heating an outer periphery of said drum, said hood including:
        a first part overlying said drum in an operative position of said first part, and
        a second part extending downwardly from said first part on a belt-departure side of said drum,
        said first part being rotatable between said operative position and an inoperative position about a second axis oriented substantially vertically and offset from said first axis in a direction toward a belt-approach side of said drum, said second axis being offset horizontally outwardly from an edge of said belt, said second part being relocatable relative to said first part to permit said hood to be swung to said inoperative position.

16. Apparatus according to claim 15, further including a hinge mounting said second part to said first part, wherein said second part is relocatable by being swung upwardly about a substantially horizontal axis of said hinge.

17. Apparatus according to claim 15, wherein said second part is relocatable by being removed.

* * * * *